June 25, 1929.  E. MOWRY  1,718,797
TRACTOR DISK HARROW
Filed Jan. 11, 1928    3 Sheets-Sheet 2
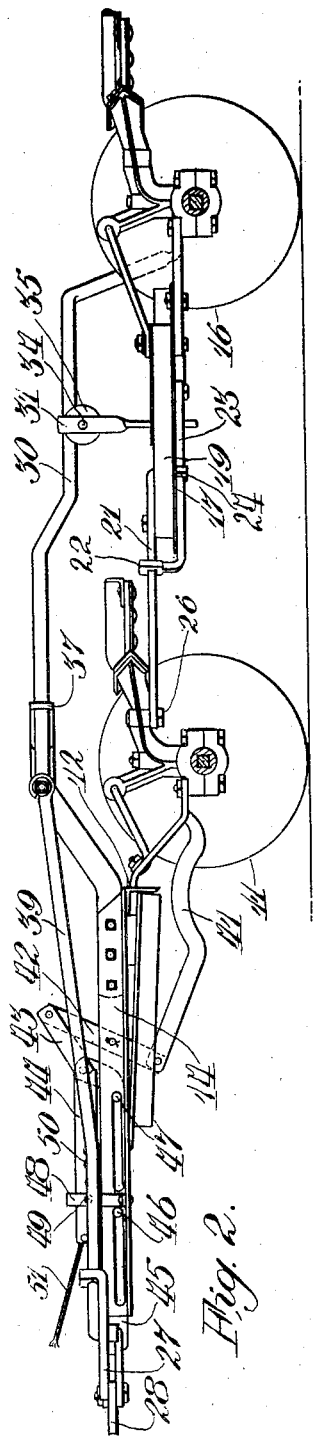
Inventor
Edward Mowry,
By
Atty.

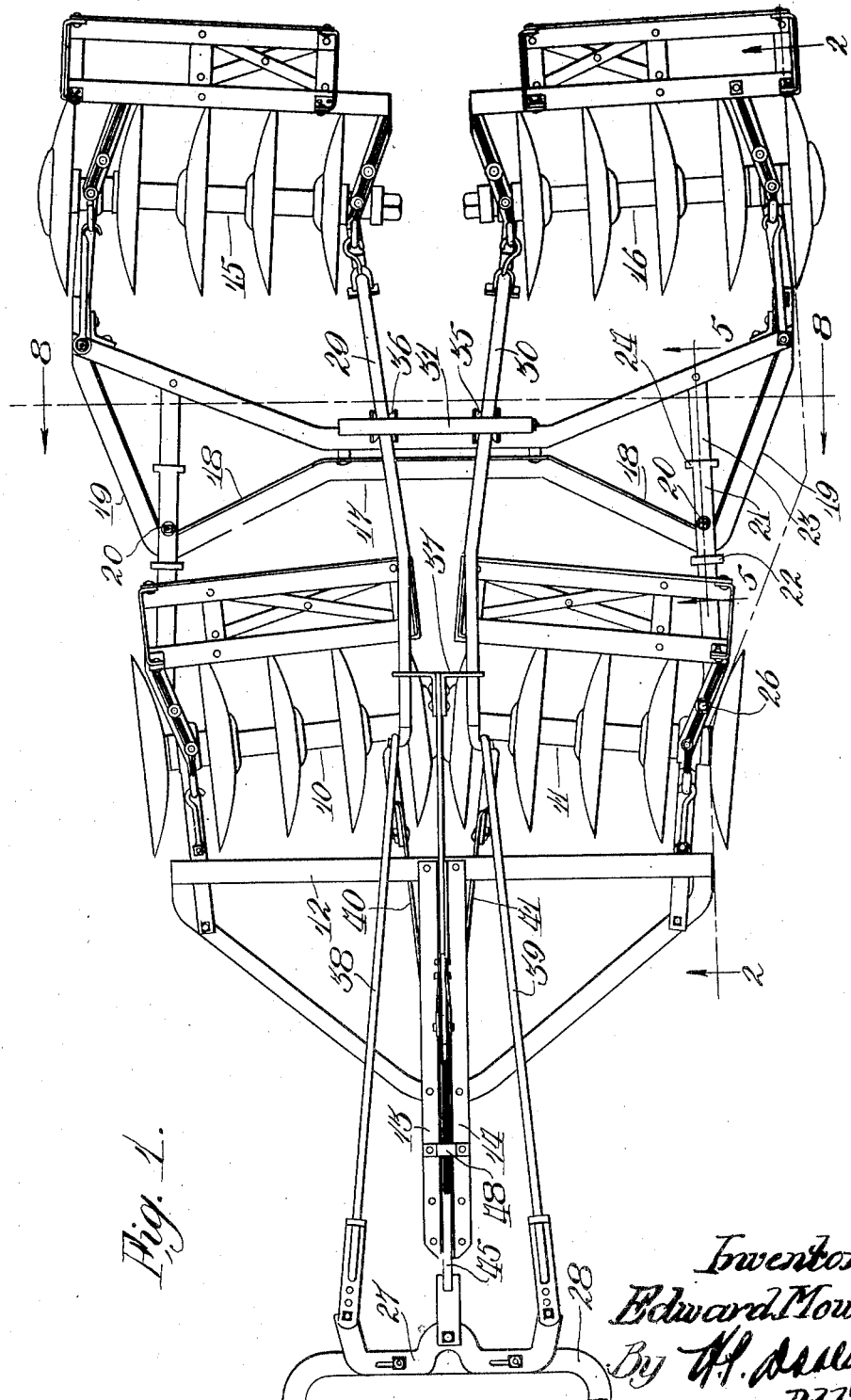

Inventor
Edward Mowry,

Patented June 25, 1929.

1,718,797

UNITED STATES PATENT OFFICE.

EDWARD MOWRY, OF ROCK FALLS, ILLINOIS, ASSIGNOR TO INTERNATIONAL HARVESTER COMPANY, A CORPORATION OF NEW JERSEY.

TRACTOR DISK HARROW.

Application filed January 11, 1928. Serial No. 245,828.

This invention presents improvements in disk harrows, and more particularly in tandem disk harrows.

An object of the invention is to provide a tandem disk harrow having novel mechanism for angling and straightening the gangs of the harrow and for relatively angling the rear gangs of the harrow upon turns.

A further object of the invention is to provide means attached to the inner ends of the rear gangs and extending forwardly to a front support, which directly acts upon the rear gangs to relatively angle them upon turns.

Other objects of the invention will appear as the following description proceeds.

An illustrative embodiment of the invention is shown in the attached drawings, in which:

Figure 1 is a plan view of the tandem disk harrow;

Figure 2 is a part sectional and part side elevational view, part of the view being taken on line 2—2 of Figure 1, showing the gang controlling devices arranged as they are when the gangs are in their transport positions;

Figure 3 is a view similar to Figure 2, but showing the gang controlling devices in their gang angling positions;

Figure 4 is a detail view showing the locking mechanism for holding the gangs in their transport positions;

Figure 5 is a detail section along the section line 5—5 of Figure 1, showing part of the connections between the forward and the rear gangs;

Figure 6:
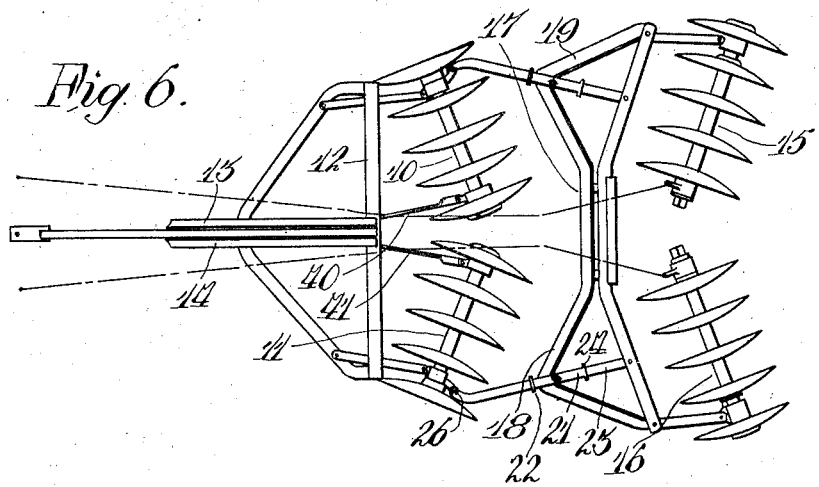
Figure 6 is a diagrammatic plan view of the harrow with its gangs angled to their working positions.

The forward disk gangs 10 and 11 are pivoted at their outer ends to a front frame including the transverse bar 12 and the parallel draft bars 13 and 14. The rear harrow gangs 15 and 16 are pivotally connected at their outer ends to a rear frame 17. The rear frame includes a transverse member which presents at its ends forwardly converging sides 18 and 19. These sides join to provide seats for the studs 20 carried at each side of the harrow by one of a pair of telescoping connecters. As illustrated in Figure 5 of the drawings, the connecter 21 passes through an opening in an upstanding part 22 of the cooperating connecter 23. The connecter 21 carries the stud 20, as clearly shown, and is formed at its rearward end with a downwardly extending projection 24 through an opening in which the connecter 23 passes. Figure 5 also shows the connecter 23 to be pivotally connected to the rear harrow frame at 25. The connecter 21 is connected to the front harrow frame at 26. This structure maintains the disks of the rear harrow gangs in correct alinement with the disks of the front harrow gangs, except on turns, when telescoping of the connecters permits rearward movement of one front gang relative to the corresponding rear gang.

Figure 1 shows gang angling and straightening connections extending rearwardly from the front transverse support 27 herein shown as a bar supported by a tractor draft bar 28 and pivoted at their rearward ends to the inner ends of the rear harrow gangs 15 and 16. These connections include bars or rods 29 and 30, which, forwardly of the rear harrow gangs, pass through guiding devices shown in Figure 8. These guiding devices comprise an upright frame 31 through which the bars pass. Journaled transversely in parts of the upright frame is a trunnion 34 carrying rollers 35 and 36 upon which the bars 29 and 30 are located, as clearly shown in Figure 8.

Figure 8:
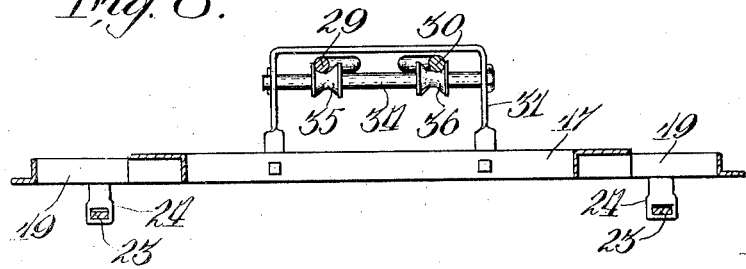
Figure 8 is a detail section on the line 8—8 of Figure 1, showing the arrangement of guiding devices for the connections extending forward from the inner ends of the rear gangs.

Forwardly of the guiding devices shown in Figure 8, the bars 29 and 30 pass through a support 37 which holds them well above the front gangs. Pivoted at the forward ends of the bars 29 and 30 are rods 38 and 39 extending forwardly and pivotally connected to the transverse bar 27, which is preferably fixed to a tractor drawbar.

The inner ends of the forward gangs have forwardly extending angling bars connected thereto. These bars are shown in Figures 1, 2 and 3 at 40 and 41. These bars are pivotally connected to an equalizer 42 pivoted on a transverse axis between the bars 13 and 14, as indicated in Figure 4 of the drawings.

Figure 4 shows the upper end of the equalizer 42 pivotally connected by means of the link 43 to a slidable draft head 45 having pins 46 and 47 movable in slots in the bars 13 and 14. The draft head 45 slides between the bars 13 and 14 and is pivotally connected to the transverse support 27. A latch bar 44 is also pivoted at one end on the draft head 45, preferably at the same point as link 43. The latch bar 44 is guided by an upright 48 secured to the front harrow frame. This upright carries a locking pin 49 which is received in notches 50 carried by the latch bar 44. The latch bar 44 is controlled by a cable 51, which extends forwardly to the tractor to enable the operator to lift the latch bar out of contact with the locking pin 49, so as to permit the tractor to angle the gangs by pulling the cross-member 27 and the bar 45 forwardly relative to the bars 13 and 14. When this happens, the connections to the rear gangs and the elements 40, 41, 42, 43, 44, 45, 46 and 47 move from the positions in which they are shown in Figure 2 to the positions in which they are shown in Figure 3, the gangs being, therefore, angled by pulling forward of the tractor.

When it is desired to bring the gangs to their transport position, or to straighten them as indicated in Figure 2, the tractor is backed up, thereby pushing cross-member 27 and the bar 45 rearwardly. This is permitted by reason of the ratchet formation of the teeth of bar 44. When the bar 45 is operated rearwardly, the upper end of the equalizer 42 is pulled rearwardly, thus pulling the inner ends of the forward gangs from their rearward positions to their forward positions and straightening those gangs. When the harrow is backed, the bar 27 forces the connections 29, 30, 38 and 39 rearwardly, thereby bringing the rear gangs to their transport or straightened positions.

Figure 6 illustrates the harrow when operating upon a straight forward course, the gangs being shown in their normal operative conditions. When the harrow is turned, it is desirable that the rear gang on the outside of the curve of turning shall be angled to a greater extent. It is also desirable that the opposite rear gang shall be angled to a lesser extent when the harrow is on a turn.

Figure 7:
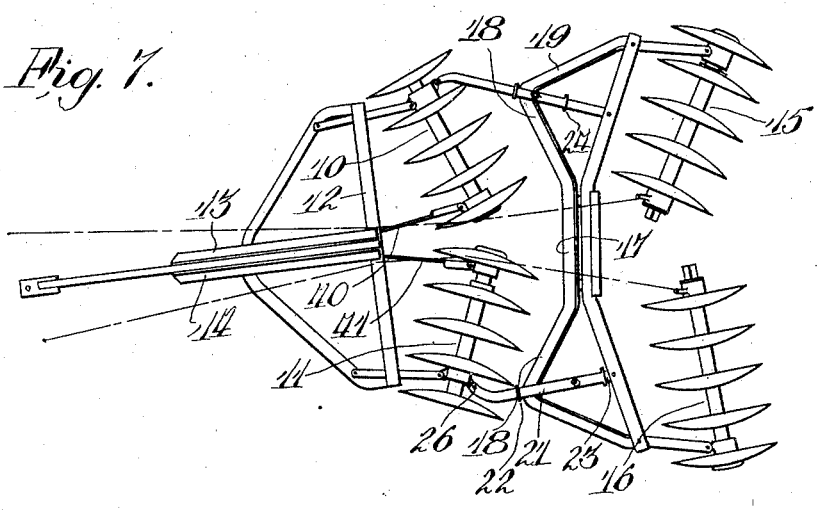
Figure 7 is a view similar to Figure 6, but showing the changed positions of the gangs upon turns.

Figure 7 illustrates the condition of the parts of the harrow on a turn toward the left. The upper or outer rear gang has its inner end pulled forwardly by means of the connections 29 and 38, which are responsive to the turning of the support 27. When the tractor is turned toward the left, the lower end of the support 27 is moved rearwardly and the inner end of the inner, or lower, rear gang is moved rearwardly relative to the position which it occupies in straightaway work, as illustrated in Figure 6.

While the invention has been described with reference to a particular structure, it is to be appreciated that it is not limited thereto, but that it is of a breadth commensurate with the scope of the subjoined claims.

What is claimed as new is:

1. A tandem disk harrow comprising, in combination, front harrow gangs arranged in end to end relation, rear harrow gangs arranged in end to end relation, and adjusting means connecting the gangs to a source of draft power, said means comprising a front transverse support, a connection between said support and the inner end of one of the rear gangs, and a separate connection between the inner end of the other rear gang and the front support and spaced laterally and movable longitudinally relative to the first connection.

2. A tandem disk harrow comprising, in combination, a front frame, two front harrow gangs pivoted at their outer ends to the front frame, means for movably connecting the inner ends of the front gangs to the front frame, a rear frame, rear harrow gangs, means for pivotally connecting the outer ends of the rear harrow gangs to the rear frame, lost motion draft connections between the outer ends of the front frame and the rear frame, a front support, draft connections between the front frame and the front support, a connecting device on one side of the longitudinal median line of the harrow connecting the front support to the inner end of one of the rear gangs, and a second connecting device on the other side of the longitudinal median lines of the harrow and connecting the front support with the inner end of the other rear gang.

3. A tandem disk harrow comprising, in combination, a front frame, front harrow gangs pivotally attached to the front frame, a rear frame, rear harrow gangs attached to the rear frame, lost motion connections between the front frame and the rear frame operating to return the rear harrow gangs to proper operative relationship with the front gangs whenever the former may be temporarily removed therefrom, a front support, draft connections between the front frame and the front support, and means connecting the front support and the rear harrow gangs for differentially angling the latter upon turns.

4. A tandem disk harrow comprising, in combination, a front frame, two front harrow gangs pivotally attached to the front frame, a rear frame, two tandem disk gangs pivotally secured to the rear frame, telescopic connections at each side of the longitudinal median line of the harrow and pivotally connected to the rear frame, means pivotally associating said connections with the front frame, means rigid with the rear frame and engaging a part on each set of said telescopic connections exerting a tendency to return the rear harrow gangs to proper operative relationship with the front harrow gangs whenever the former have been temporarily removed therefrom, a front support, a draft bar secured to the front support and slidably associated with the front frame, connections between said draft bar and the inner ends of the front gangs, a connection between the inner end of one rear gang and said front support, a separate connection between the inner end of the other rear gang and the front support spaced from the first mentioned connection, means carried by the front frame for guiding said connections between the front support and the rear gangs, and rolling supports carried by the rear frame and engaging said last mentioned connections.

5. A tandem disk harrow comprising, in combination, a front frame, two front harrow gangs pivoted to the front frame, means for movably connecting the front gangs to the front frame, a rear frame, rear harrow gangs, means for pivotally connecting the rear harrow gangs to the rear frame, lost motion draft connections between the front frame and the rear frame, a front support, draft connections between the front frame and the front support including relatively movable parts, a connecting device on one side of the longitudinal median line of the harrow directly connecting the front support to one of the rear gangs, and a second connecting device on the other side of the longitudinal median line of the harrow and connecting the front support with the other rear gang.

6. A tandem disk harrow comprising, in combination, a front frame, front harrow gangs pivotally attached to the front frame, a rear frame, rear harrow gangs attached to the rear frame, telescoping lost motion connections between the front frame and the rear frame operating to return the rear harrow gangs to proper operative relationship with the front gangs whenever the former are temporarily removed therefrom, a front support, draft connections between the front frame and the front support, and a plurality of separate means connecting the front support and the rear harrow gangs for differentially angling the latter upon turns.

7. A tandem disk harrow comprising, in combination, a front frame, two front harrow gangs pivotally attached to the front frame, a rear frame, two tandem disk gangs pivotally secured to the rear frame, a telescopic connection at each side of the longitudinal median line of the harrow and pivotally connected to the rear frame, means pivotally associating each of said connections with the front gangs, means rigid with the rear frame and engaging a part on each set of said telescopic connections and exerting a tendency to return the rear harrow gangs to proper operative relationship with the front harrow gangs whenever the former have been temporarily removed therefrom, a front support, a draft bar secured to the front support and slidably associated with the front frame, connections between said draft bar and the inner ends of the front gangs, a connection between the inner end of one rear gang and said front support, a separate connection between the inner end of the other rear gang and the front support spaced from the first mentioned connection, means carried by the front frame for guiding said connections between the front support and the rear gangs, and guides carried by the rear frame and engaging said last mentioned connections.

In testimony whereof I affix my signature.

EDWARD MOWRY.